United States Patent
Fujii et al.

(10) Patent No.: US 7,752,298 B2
(45) Date of Patent: Jul. 6, 2010

(54) SYSTEM FOR MANAGING AND ACQUIRING DEVICE PROFILE INFORMATION

(75) Inventors: Kenichi Fujii, Yokohama (JP); Takashi Hirata, Yokohama (JP); Masaki Shitano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 11/761,612

(22) Filed: Jun. 12, 2007

(65) Prior Publication Data

US 2007/0294382 A1 Dec. 20, 2007

Related U.S. Application Data

(63) Continuation of application No. PCT/JP2005/021696, filed on Nov. 25, 2005.

(30) Foreign Application Priority Data

Dec. 17, 2004 (JP) ............... 2004-366007

(51) Int. Cl.
*G06F 15/173* (2006.01)
(52) U.S. Cl. ............... 709/223; 709/246; 709/224
(58) Field of Classification Search ......... 709/223–226, 709/246
See application file for complete search history.

(56) References Cited

U.S. PATENT DOCUMENTS

| | | | | |
|---|---|---|---|---|
| 6,122,639 | A * | 9/2000 | Babu et al. ............... | 707/103 R |
| 6,269,099 | B1 * | 7/2001 | Borella et al. ............. | 370/389 |
| 6,636,499 | B1 * | 10/2003 | Dowling ................. | 370/338 |
| 6,909,721 | B2 * | 6/2005 | Ekberg et al. ............. | 370/401 |
| 7,065,579 | B2 * | 6/2006 | Traversat et al. .......... | 709/230 |
| 7,397,788 | B2 * | 7/2008 | Mies et al. ............... | 370/351 |
| 7,640,327 | B2 * | 12/2009 | Humpleman et al. ....... | 709/223 |
| 2002/0052966 | A1 | 5/2002 | Isomura et al. ........... | 709/230 |
| 2002/0184373 | A1 * | 12/2002 | Maes ..................... | 709/228 |
| 2003/0050963 | A1 * | 3/2003 | Lamming et al. .......... | 709/203 |
| 2003/0177270 | A1 * | 9/2003 | Noda et al. .............. | 709/246 |
| 2006/0156252 | A1 * | 7/2006 | Sheshagiri et al. ........ | 715/825 |
| 2006/0184661 | A1 * | 8/2006 | Weisman et al. .......... | 709/224 |
| 2006/0230130 | A1 * | 10/2006 | Cho et al. ................ | 709/223 |

FOREIGN PATENT DOCUMENTS

| | | |
|---|---|---|
| JP | 5-316116 | 11/1993 |
| JP | 7-298359 | 11/1995 |
| JP | 10-143420 | 5/1998 |
| JP | 2002-073436 | 3/2002 |
| JP | 2002-196990 | 7/2002 |
| JP | 2002-202933 | 7/2002 |
| JP | 2003-345427 | 12/2003 |
| JP | 2004-272376 | 9/2004 |

* cited by examiner

*Primary Examiner*—Nathan Flynn
*Assistant Examiner*—James E Conaway
(74) *Attorney, Agent, or Firm*—Fitzpatrick, Cella, Harper & Scinto

(57) ABSTRACT

A printer (702) manages profile information and communicates with another device across a network (710). The printer (702) receives an acquisition request (1001) of the profile information, issues an acquisition request (1002) of profile information of a display (703), and receives a result response (1003) as the profile information from the display (703). The printer (702) processes the acquisition request (1001) of the profile information in accordance with the profile information managed and the profile information of the display (703), and returns a processing result as a result response (1004).

6 Claims, 11 Drawing Sheets

FIG. 8

701 DEVICE (DIGITAL CAMERA)

STATIC INFORMATION
MODEL NAME : Digital Camera 100
TYPE : DIGITAL CAMERA
SERIAL NUMBER : 1234567-ABC INTERFACE INFORMATION
PROTOCOL : P1
SERVICE 1: RECORDING (STILL IMAGE)
SERVICE 2: RECORDING (MOVING IMAGE)

STATUS
REMAINING BATTERY LEVEL : 50%
NUMBER OF RECORDABLE IMAGES: 12
RECORDING MODE: AUTOFOCUS

702 DEVICE (PRINTER)

STATIC INFORMATION
MODEL NAME : Color Printer 200
TYPE: PRINTER
SERIAL NUMBER : 1234567-DEF INTERFACE INFORMATION
PROTOCOL : P1
SERVICE 1: PRINTING (HIGH RESOLUTION)
SERVICE 2: PRINTING (LOW RESOLUTION)

STATUS
REMAINING INK AMOUNT: 20%
REMAINING SHEET COUNT: 100

703 DEVICE (DISPLAY)

STATIC INFORMATION
MODEL NAME : Display 300
TYPE: DISPLAY
SERIAL NUMBER : 1234567-GHI INTERFACE INFORMATION
PROTOCOL : P1
SERVICE 1: DISPLAY (STILL IMAGE)
SERVICE 2: DISPLAY (MOVING IMAGE)

STATUS
COLOR TEMPERATURE: NORMAL

710

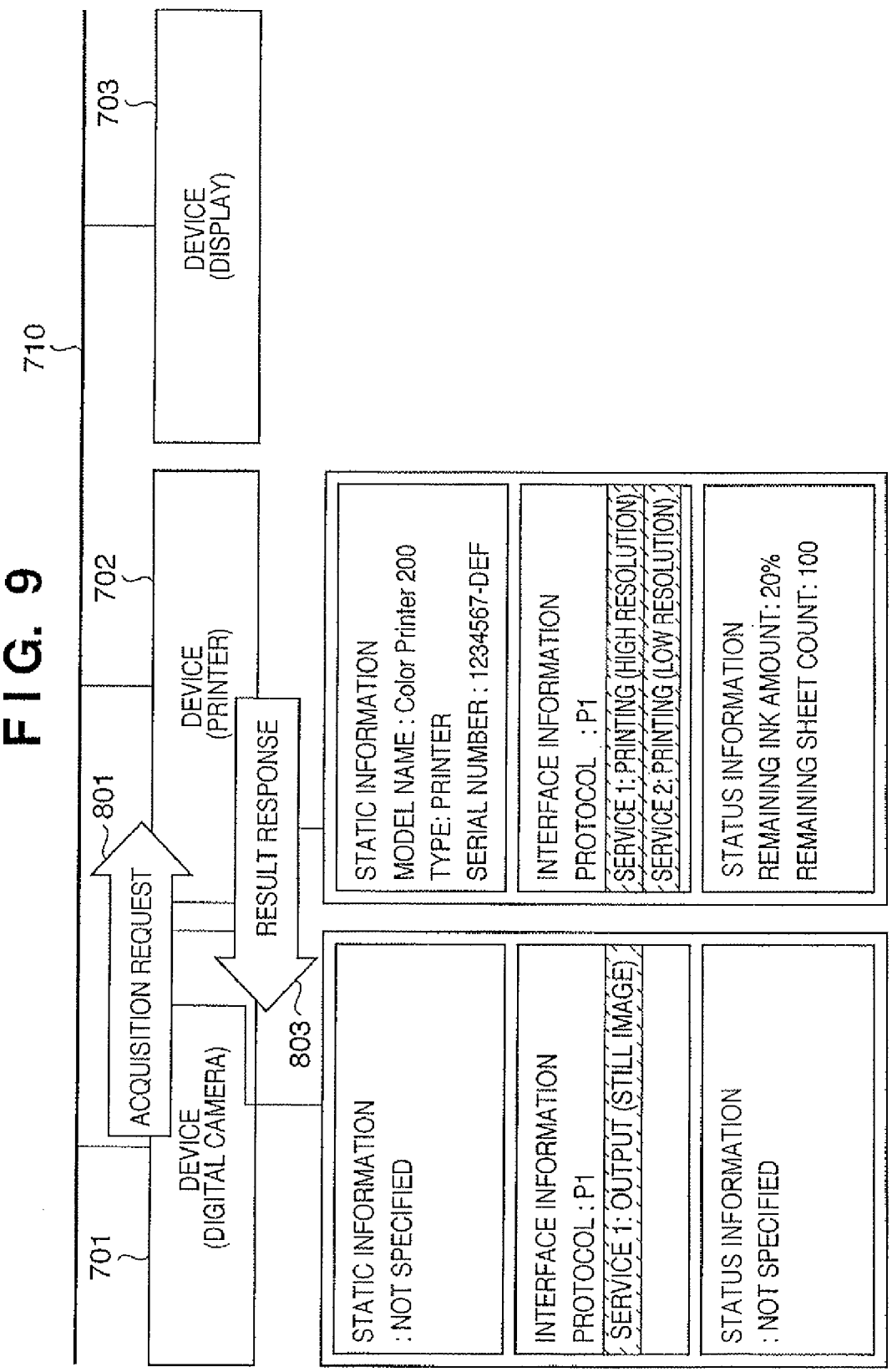

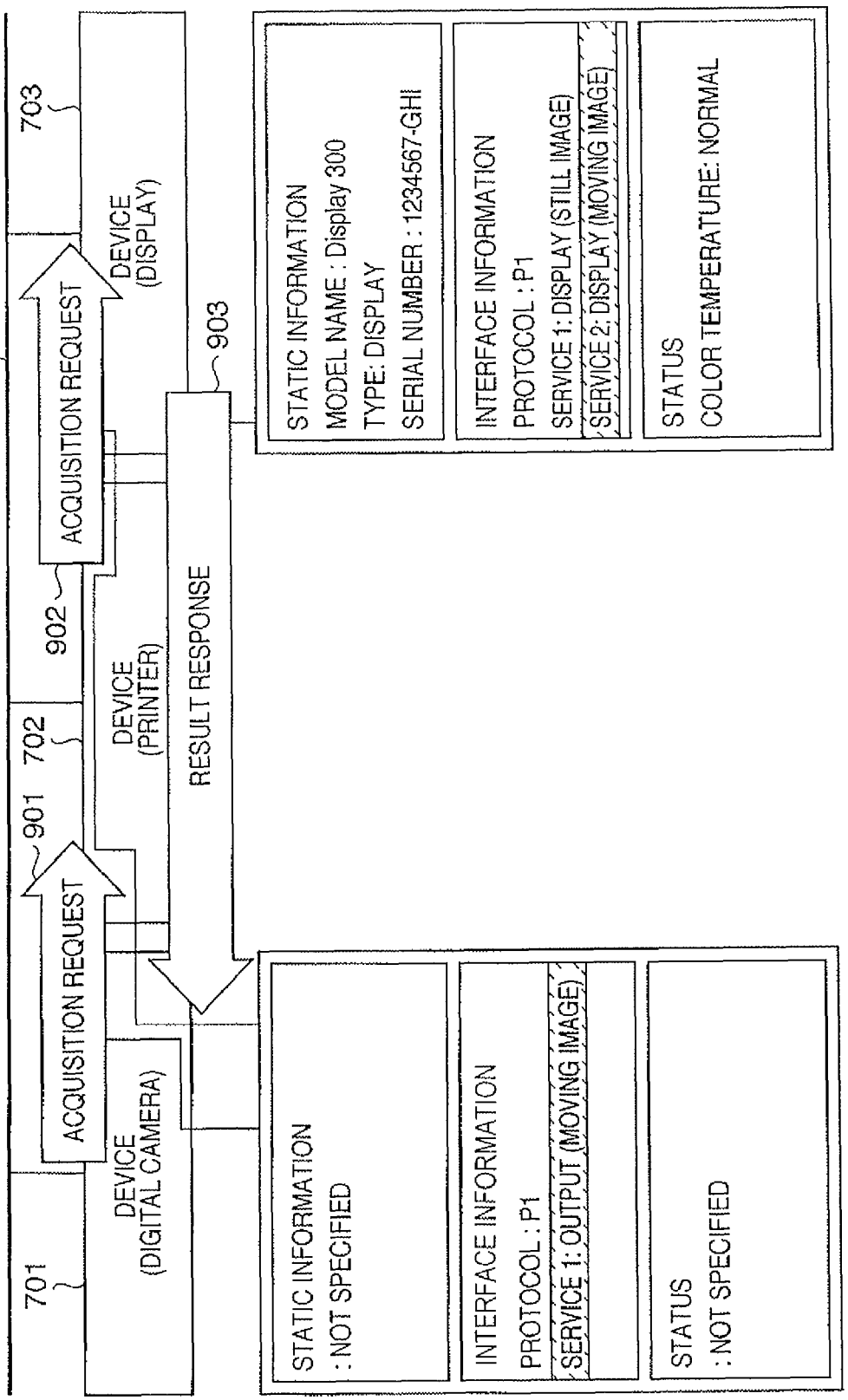

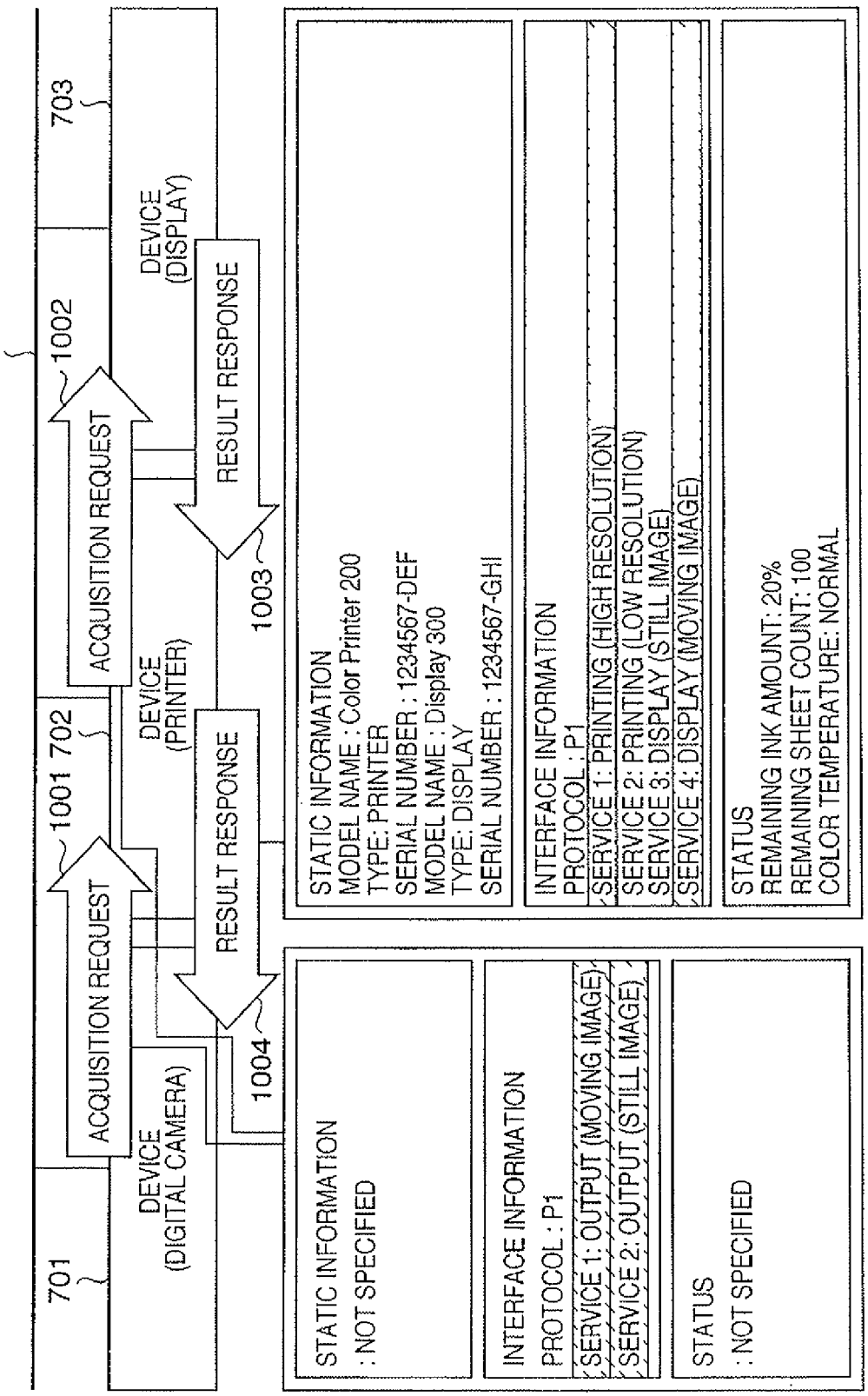

SYSTEM FOR MANAGING AND ACQUIRING DEVICE PROFILE INFORMATION

RELATED APPLICATION

This application is a continuation of International Application PCT/JP05/021696, filed Nov. 25, 2005.

TECHNICAL FIELD

The present invention relates to a profile acquiring method, device, program, and recording medium.

BACKGROUND ART

The advance of computer technologies is beginning to realize functions such as association and linking of processes across networks even in office devices and general household appliances. Device control protocols such as UPnP (Universal Plug and Play), Jini®, and Jxta® are known as network technologies that implement fusion of these device controllers across networks.

UPnP will be described below as a representative example. UPnP is a device control protocol used on networks that support practical standard protocols, such as IP (Internet Protocol), TCP (Transfer Control Protocol), UDP (User Datagram Protocol), HTTP (HyperText Transfer Protocol), and XML (eXtensible Markup Language), in the Internet world.

UPnP uses SSDP (Simple Service Discover Protocol) to find a device controller connected to a network, and grasp profile information expressing the predefined specifications and settings of a device controller to be controlled. SSDP is a fundamental portion that constitutes UPnP, and IETF has issued standard specifications. UPnP uses IP broadcast to find a device it wants. For example, when "a device capable of playing back digital video streams?" is broadcast, devices matching the condition voluntarily transmit their IP addresses and host names to the inquiry source. Also, the profile information indicating the predefined specifications and settings and practical functions of a device controller to be controlled is exchanged at that time. The data format used in information exchange is XML, and the information is communicated by HTTP.

SOAP (Simple Object Access Protocol) is used to control a device. SOAP is an RPC-based Internet communication industry standard protocol that is determined in order to smoothly exchange XML Web services. SOAP is used to transmit a control message to a device and obtain a result or error. A UPnP control request is a SOAP message containing an action that calls by designating a parameter. The response is also a SOAP message and contains a status, and a value and parameter are returned.

A device control protocol (e.g., UPnP) used to interconnect devices across a network often adopts a method that exchanges the entire profile information having a predetermined structure following one predetermined profile exchanging procedure (e.g., SSDP).

For example, patent reference 1 describes that a device with low throughput can deal with large amounts of information by exchanging profile information between devices and then arranging, in a temporary save location, an area for internal processing such as document processing.

Patent reference 1: Japanese Patent Laid-Open No. 10-143420

DISCLOSURE OF INVENTION

Problems that the Invention is to Solve

A profile management means in a conventional device is to acquire profile information of another device. Even when a plurality of devices is connected to a network, they can be used only individually.

Patent reference 1 extends the capability of a device with that of another device by exchanging profile information (capability information) to determine the behaviors of the devices. However, this only complements limited capability of a low function by using another device.

The present invention makes it possible to respond to a profile acquisition request by using profiles of other communication devices.

Means of Solving the Problems

According to the present invention, a communication device communicating with another communication device via a network is characterized by comprising a management unit adapted to manage profile information, a reception unit adapted to receive an acquisition request of the profile information and profile information of the other communication device, and a processing unit adapted to process the acquisition request of the profile information in accordance with the profile information managed by the management unit and the profile information of the other device received by the reception unit.

According to the present invention, a profile information acquisition request processing method for a communication device, which manages profile information and communicates with another communication device via a network, is characterized by comprising receiving an acquisition request of the profile information, receiving profile information of the other device, and processing the acquisition request of the profile information in accordance with the profile information managed and the received profile information of the other device.

EFFECTS OF THE INVENTION

According to the present invention, it is possible to respond to a profile acquisition request by using profiles of other communication devices.

Also, the present invention allows effective use of communication devices connected to a network.

Further features of the present invention will become apparent from the following description of exemplary embodiments with reference to the attached drawings.

BRIEF DESCRIPTION OF DRAWINGS

FIG. 8 is a view showing an example of a practical processing procedure according to an embodiment of the present invention;

FIG. 9 is a view showing an example of a practical processing procedure according to an embodiment of the present invention;

FIG. 10 is a view showing an example of a practical processing procedure according to an embodiment of the present invention; and FIG. 11 is a view showing an example of a practical processing procedure according to an embodiment of the present invention.

BEST MODE FOR CARRYING OUT THE INVENTION

The best mode for carrying out the present invention will be described below in detail with reference to the accompanying drawings.

Figure 1:
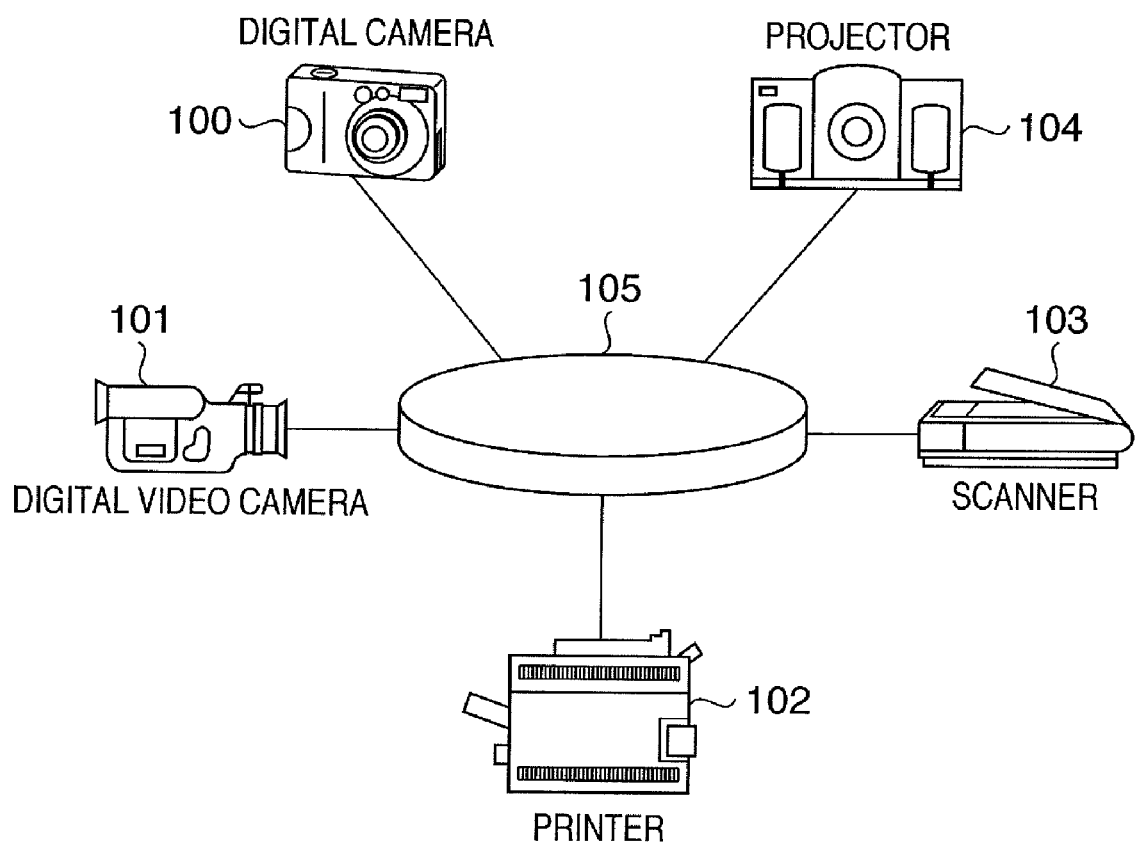
FIG. 1 is a view showing the basic configuration of a whole profile management system.

FIG. 1 shows an example of the configuration of a whole system comprising devices (communication devices) to which the present invention is applicable. As shown in FIG. 1, a digital camera 100, digital video camera 101, printer 102, scanner 103, and projector 104 are connected to a network 105. These devices respectively store profile information according to their specifications and statuses. The devices are configured to call functions and exchange the profile information with each other across the network 105. The devices 100 to 104 are communication devices communicating with other communication devices across the network 105.

Figure 2:
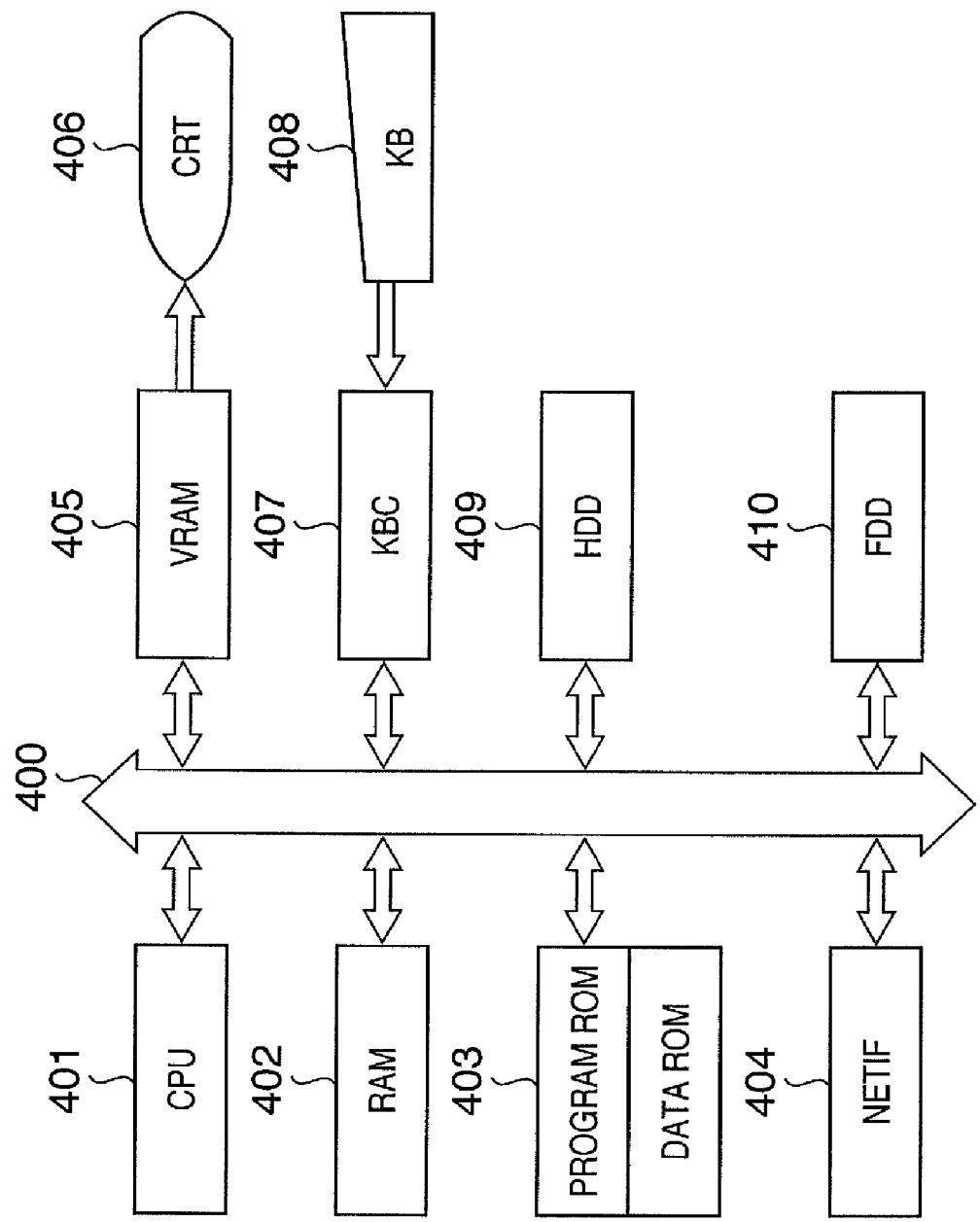
FIG. 2 is a block diagram when a device connected to a profile management system is implemented by using a PC (Personal Computer)

As an example, a case in which a device (the devices 100 to 104 shown in FIG. 1) connected to a profile management system according to an embodiment of the present invention consists of a computer system such as a PC (Personal Computer) will be explained below with reference to FIG. 2.

Note that the device can be implemented not only by a PC (Personal Computer) but also by the devices as shown in FIG. 1, devices having a communication function of communicating with other devices, which include, for example, a workstation, a notebook PC, a palmtop PC, various household appliances such as a television set having a built-in computer, a game machine having a communication function, a telephone, a cell phone, and an electronic organizer, or combinations of these devices.

Reference numeral 401 in FIG. 2 denotes a central processing unit (to be referred to as a CPU hereinafter) that controls the computer system. The CPU 401 is a computer that operates in accordance with programs, and performs determination and control to be described later. Reference numeral 402 denotes a random access memory (to be referred to as a RAM hereinafter) that functions as a main memory of the CPU 401, an area of execution programs, an execution area of the programs, and a data area.

Reference numeral 403 denotes a read-only memory (to be referred to as a ROM hereinafter) recording the operation procedures of the CPU 401. The ROM 403 includes a program ROM recording basic software (OS) as a system program for performing device control of the computer system, and a data ROM recording, for example, information necessary to operate the system. An HDD 409 to be described later is sometimes used instead of the ROM 403.

Reference numeral 404 denotes a network interface (to be referred to as an NETIF hereinafter) that performs control for transferring data between computer systems across the network 105 and diagnoses the connection status. Each device shown in FIG. 1 communicates with other devices via the NETIF 404.

Reference numeral 405 denotes a video RAM (to be referred to as a VRAM hereinafter) that renders images to be displayed on the screen of a CRT 406 to be described later which displays the operation state of the computer system, and controls the display of the CRT 406. Reference numeral 406 denotes a display device such as a display. The display 406 will be referred to as a CRT hereinafter.

Reference numeral 407 denotes a controller that controls input signals from an external input device 408 to be described below. Reference numeral 408 denotes the external input device such as a keyboard for accepting operations the user of the computer system performs on it.

Reference numeral 409 denotes a storage device such as a hard disk. The HDD 409 is used to save application programs and data such as image information. In this embodiment, the application programs are software programs that execute various device control means constituting this embodiment. Reference numeral 410 denotes an external input/output device that inputs and outputs a removable storage device such as a floppy® disk drive or CD-ROM drive, and is used to read out the application programs described above from the medium. The external input/output device 410 will be referred to as an FDD hereinafter. Note that the application programs and data stored in the HDD 409 may also be used by storing them in the FDD 410.

Reference numeral 400 denotes an input/output bus (an address bus, data bus, and control bus) for connecting the units described above.

Figure 3:
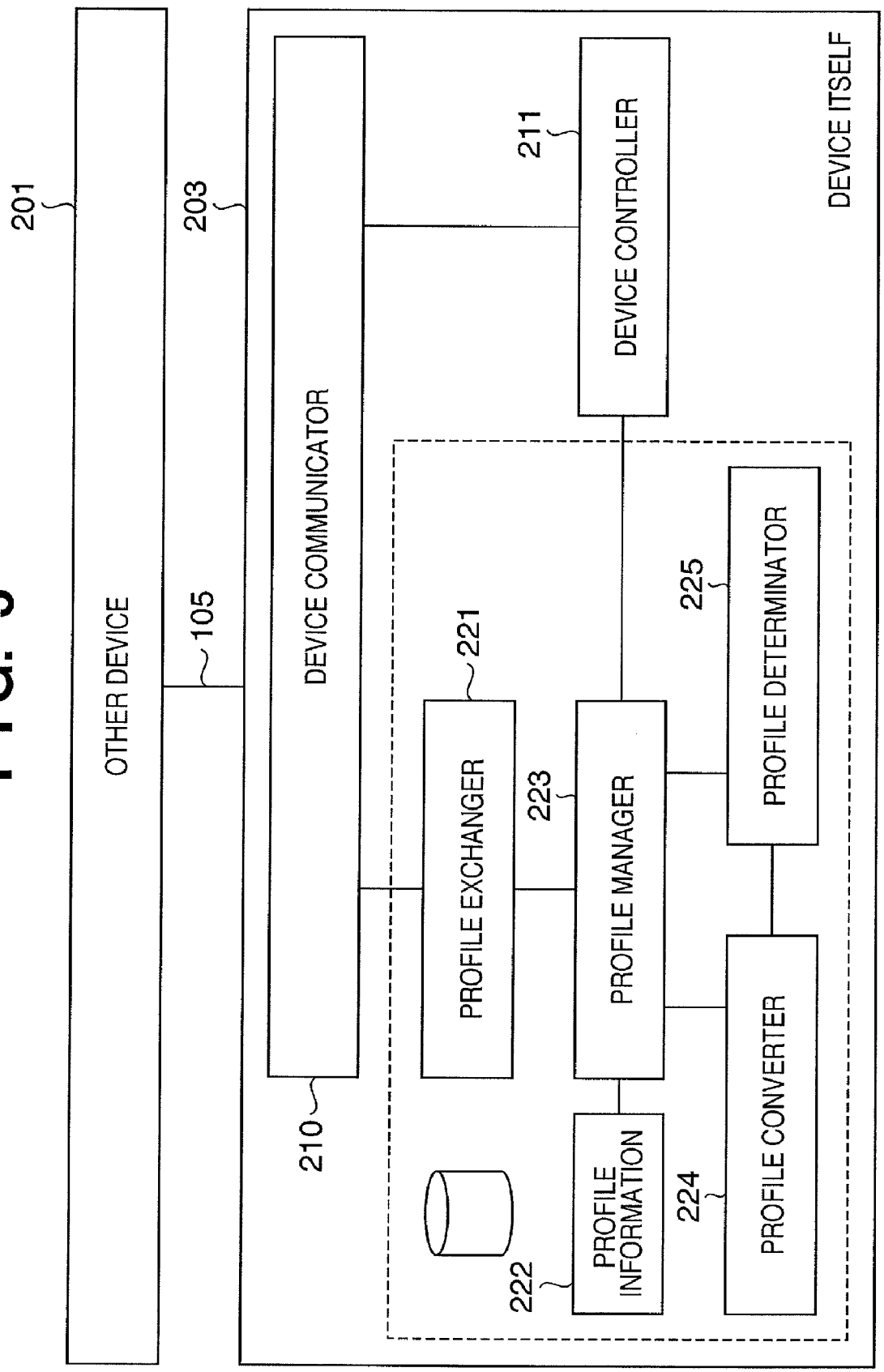
FIG. 3 is a functional block diagram showing main elements with which each device is equipped.

FIG. 3 shows main elements with which each device arranged in FIG. 1 is equipped. FIG. 3 shows the connection relationship between a device itself 203 and other device 201 across the network 105 as a whole. FIG. 3 is a diagram showing a simplified relationship in which a plurality of types of devices shown in FIG. 1 are limited to two devices. That is, the other device 201 is one of the devices 100 to 104 in FIG. 1, and the device itself 203 is another one of the devices 100 to 104. FIG. 3 is a diagram in which functions of the device itself 203 are expressed by blocks.

The internal configuration of the device itself 203 will be explained below. There exists a device communicator 210. The device communicator 210 executes fundamental communication processing necessary to connect the device itself 203 to the other device 201 across the network 105. The device communicator 210 is implemented by the NETIF 404 and CPU 401 in FIG. 2. The NETIF 404 or device communicator 210 is a reception means for receiving a profile acquisition request and a profile of the other device.

A device controller 211 is shown below the device communicator 210. The device controller 211 controls and performs functions of the device itself 203. A network-compatible device usually has the device communicator 210 and the device controller 211. In practice, the device has elements with various functions for further implementing practical behaviors of its own from the device controller 211. However, the device controller 211 represents all the elements in FIG. 3.

The characteristic configuration of the device itself 203 includes all or some of a profile exchanger 221, profile manager 223, profile information 222, profile converter 224, and profile determinator 225, which are enclosed by the dotted line in the device itself 203. Processing which individual elements are in charge of is described below.

The RAM 402 contains the profile information 222. The functional blocks except for the device communicator 210 and profile information 222 of the device itself 203 shown in FIG. 3 are implemented when the CPU 401 in FIG. 2 executes some corresponding program steps.

The device communicator 210 receives the information transmitted by the other device 201 across the network 105 without exception. The device communicator 210 which has received the information transfers it to the device controller 211 as usual when the information indicates a call function of a device. However, when processing is associated with profiles, the device communicator 210 transfers the processing to the profile exchanger 221. That is, the CPU 401 interprets the information received by NETIF 404, and switches between processes of the device controller 211 and profile exchanger 221.

The profile exchanger 221 is in charge of receiving the information received by the device communicator 210 and transferring the information after the profile manager 223 converts the information into an interpretable format.

The profile information 222 is managed by the profile manager 223. The profile information 222 expresses the specifications or functions and internal state (status) of the device itself 203. The profile manager 223 sequentially reflects the internal state or the like of the device itself 203 to the profile information 222 to maintain the latest state. Furthermore, the profile manager 223 issues instructions to the profile converter 224 or profile determinator 225 in accordance with the profile information received by the profile exchanger 221.

The profile converter 224 associates and edits a plurality of pieces of profile information based on the instructions of the profile determinator 225 which has received a request from the profile manager 223. The profile determinator 225 receives a profile acquisition request from the profile manager 223. The profile determinator 225 determines a response to be created and executes the creation by using the profile information 222 as a profile of the device itself and the like. The profile determinator 225 is a processing means for processing the profile acquisition request in accordance with the profile information 222 and profile information of the other device.

Figure 4:
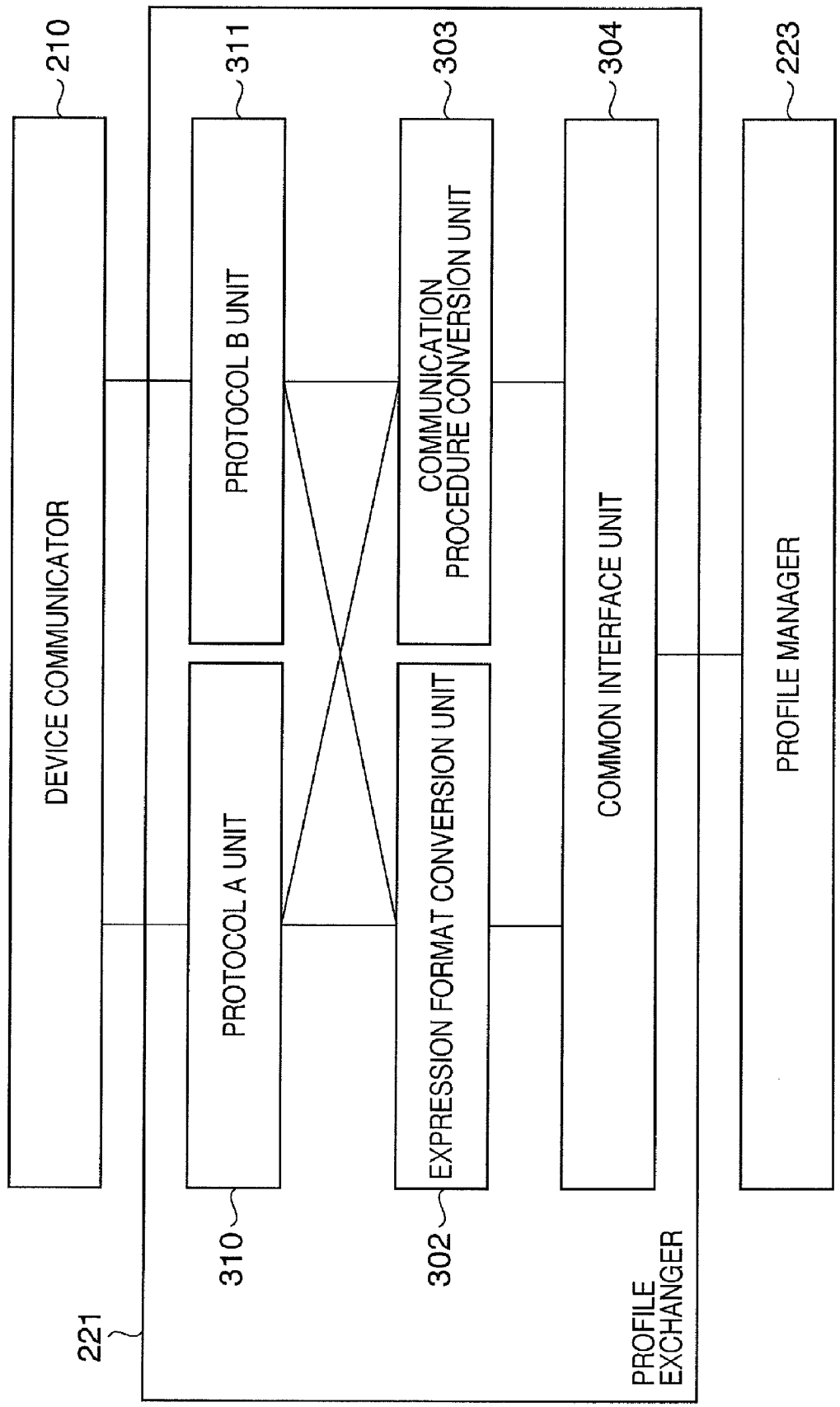
FIG. 4 is a functional block diagram for explaining a profile exchanger 221 in more detail.

FIG. 4 is a block diagram for explaining the profile exchanger 221 in FIG. 3 in more detail. The profile exchanger 221 passes, to the profile manager 223, the profile acquisition request received by the device communicator 210 from the remaining device 201, or passes a response from the profile manager 223 to the remaining device 201 via the device communicator 210.

In order to implement simultaneous use of a plurality of communication means (communication protocols) for profile exchange processing, the profile exchanger 221 is configured to accommodate a plurality of protocol processing units. Note that each protocol processing unit interprets processing of each type of communication protocol. When receiving the information using a protocol A, the device communicator 210 transfers the received information to a protocol A unit 310. When receiving the information using a protocol B, the device communicator 210 transfers the received information to a protocol B unit 311.

FIG. 4 shows two protocol processing units, that is, the protocol A unit 310 and protocol B unit 311, to indicate that a plurality of such protocol processing units exist at the same time. However, FIG. 4 shows that the profile exchanger 221 can simultaneously accommodate an arbitrary number of protocol processing units which can process communication protocols different from each other. Therefore, two or more protocol units (e.g., a communication protocol C unit in addition to the above two units) may be added.

The communication protocol consists of an expression format of information in communicating and the procedure of communication itself. An expression format conversion unit 302 executes processing associated with the expression format of the information. A communication procedure conversion unit 303 absorbs the differences of communication procedures, and is connected to the profile manager 223 via a common interface unit 304. This makes it possible to handle profile exchange processing in a plurality of different communication protocols in the same way.

Note that the processing described herein, which is associated with the expression format of information and executed by the expression format conversion unit 302, indicates processing which does not process the contents of the information itself but standardizes only the expression format. For example, it indicates processing for converting information expressed by a structure as a binary format into that expressed by XML as a text format.

Further processing for converting the contents themselves of the information to implement the mutual operation is performed by the profile converter 224. The expression format conversion unit 302 is a conversion means for converting profile information, which corresponds to the profile information 222 and profile information of the remaining device, in accordance with the expression format of the acquisition request.

Figure 5:
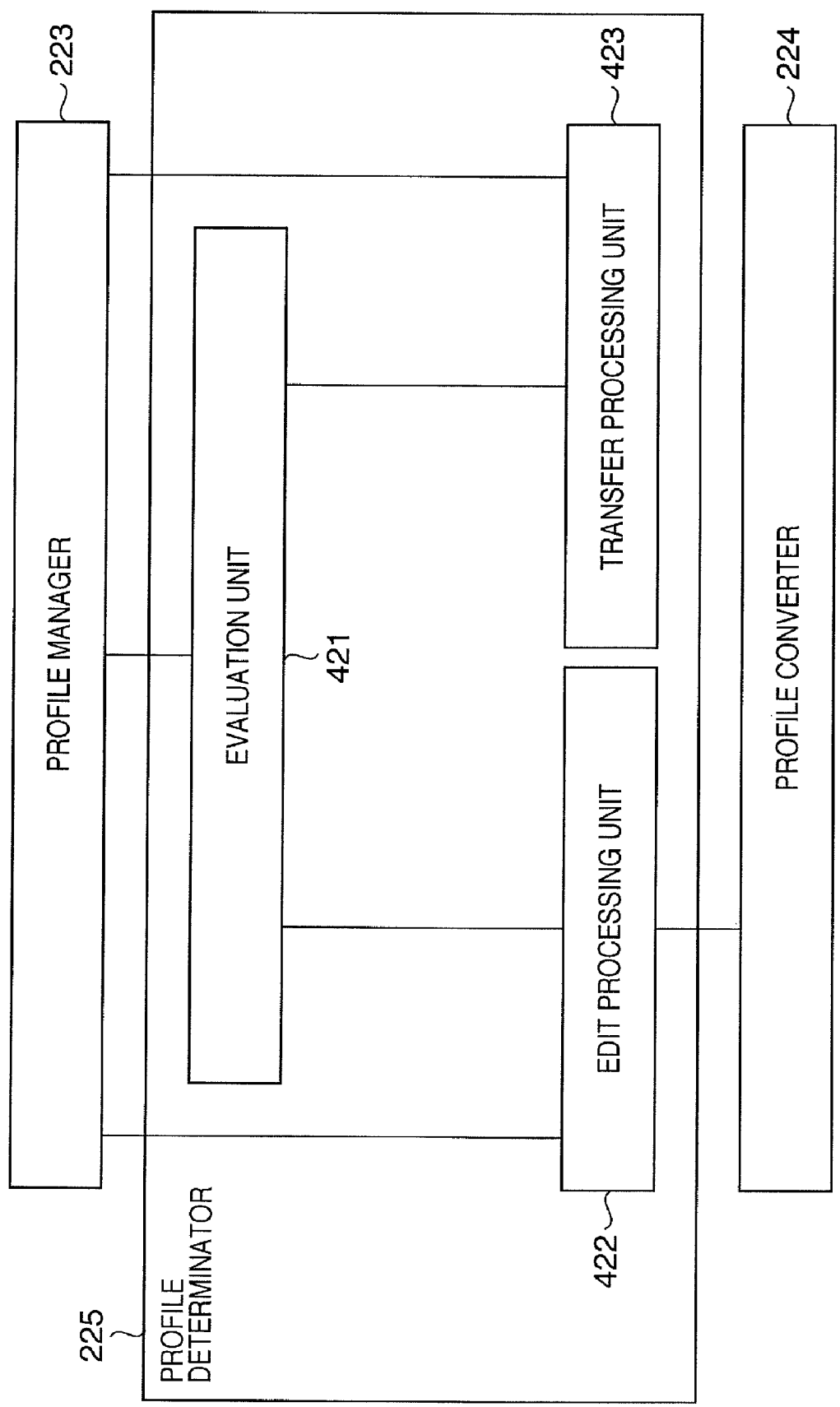
FIG. 5 is a functional block diagram for explaining a profile determinator 225 in more detail.

FIG. 5 is a block diagram for explaining the profile determinator 225 in FIG. 3 in more detail. The profile determinator 225 receives a profile acquisition request from the profile manager 223, determines processing result to be returned, and creates a response. An evaluation unit 421 evaluates the profile information 222 held by the profile manager 223 together with the contents of the profile acquisition request to determine a response to be returned.

When the processing determined in the evaluation unit 421 needs edit processing of the profile information such as association and combining, an edit processing unit 422 executes the edit processing. The edit processing unit 422 executes the edit processing so that profile information containing the profile information 222 and profile information of the remaining device (remaining communication device) is transmitted to the transmission source of the acquisition request. The edit processing unit 422 sometimes requests the profile converter 224 to perform part of the processing in order to accurately manipulate the profile information. The edit processing unit 422 may be integrated with the profile converter 224. After the response created as described above is returned to the profile manager 223 and the other device 201, the source is informed of the response.

A transfer processing unit 423 executes transfer processing for transferring a profile acquisition request from the other device 201 to another device (not shown) so as to send back profile information of another device (not shown) to the other device 201 which has issued the profile acquisition request. That is, the transfer processing unit 423 performs the transfer processing so that the profile information of another device (another communication device) is transmitted to the transmission source of the acquisition request.

Figure 6:
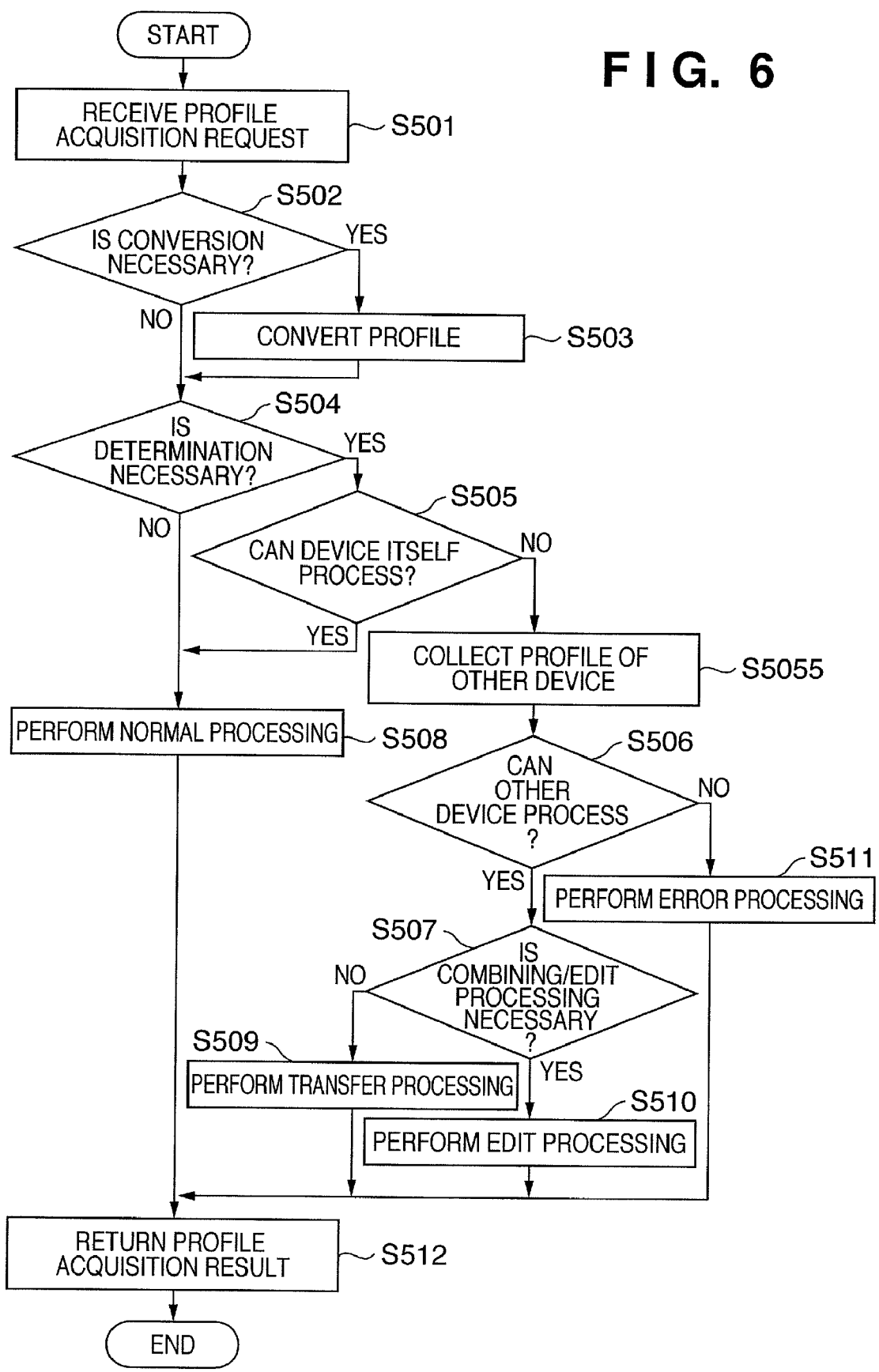
FIG. 6 is a flowchart of processing according to an embodiment of the present invention.

FIG. 6 is a flowchart for explaining a characteristic part of processing according to an embodiment of the present invention. Steps of the processing will be described below together with the configuration explained with reference to FIGS. 1 to 5. This flowchart shows a profile information acquisition request processing method for a device (a communication device) which manages profile information and communicates with the remaining devices (remaining communication devices) across a network. FIG. 6 will be explained with reference to functional blocks in FIGS. 3 to 5 implemented by a program which the CPU 401 reads out from the HDD 409 or FDD 410, or receives from the NETIF 404. It can be considered that FIG. 6 shows part of the control program read out by the CPU 401 from the HDD 409 or FDD 410 to be executed, or part of the program received by the CPU 401 from the NETIF 404. In this case, the HDD 409 and FDD 410 are storage media storing a profile information acquisition request processing program in a form which the CPU 401 as a computer can read.

In step S501, the device communicator 210 receives a profile acquisition request issued by the remaining device 201. That is, the device communicator 210 receives a request for acquisition of profile information. In practice, when the request is, for example, issued by protocol A, the remaining device 201 issues a request to the protocol A unit 310 of the profile exchanger 221 by way of the device communicator 210 across the network 105. The protocol A unit 310 makes full use of the expression format conversion unit 302 and communication procedure conversion unit 303 as needed to perform processing corresponding to the protocol A, and transfers the result to the common interface unit 304. The control is transferred to the profile manager 223.

In step S502, it is determined whether or not the profile acquisition request obtained as described above requires conversion of the profile information 222 held in the device itself 203. This process is executed in the profile manager 223. The profile manager 223 determines an information expression format by interpreting the profile acquisition request transmitted from the other device 201, and also determines an information expression format of the profile information 222. If the information expression format of the profile acquisition request transmitted from the other device 201 matches that of the profile information 222 held by the profile manager 223, the profile manager 223 determines that the conversion is not necessary; otherwise, the information expression format of the profile acquisition request is converted in step S503. This process is executed in the profile converter 224.

The profile acquisition request standardized as explained above is determined in step S504. This process is performed in the profile manager 223. If the request requires acquisition of specific profile information of the device itself 203, since it suffices to meet the requirement, the determination is not necessary. That is, if the profile acquisition request designates the device itself 203, since it suffices to meet the requirement, the determination is not necessary. Hence, the process advances to normal processing in step S508, that is, to processing for returning a response using the profile information 222 of the device itself 203 without any change. If the profile acquisition request requires something other than acquisition of specific profile information of the device itself 203, that is, if it can be determined that the profile acquisition request is a request for discovery/search of a device through the profile information, the process advances to step S505.

Step S505 is executed in the evaluation unit 421 of the profile determinator 225. In step S505, the evaluation unit 421 determines whether or not the acquisition request processing can be performed by using the profile information 222 of the device itself 203. That is, if the device itself 203 can respond to the request for search of a device having specific profile information, the device itself 203 only needs to return the profile information 222 of its own. Hence, the process advances to the normal processing in step S508. In other words, if the profile information 222 contains profile information requested by the search request, the process advances to the normal processing in step S508; otherwise, the process advances to step S5055.

In step S5055, the profile of a remaining device is collected. If the evaluation unit 421 has profiles which have been stored in a cache (in the RAM 402) in previous transferring and combining processing (steps S509 and S510), the evaluation unit 421 utilizes them. On the other hand, if the evaluation unit 421 has no profile, the evaluation unit 421 collects a profile from another device via the device communicator 210 (the evaluation unit 421 requests the other device to send its profile and then receives the response from the other device). That is, the evaluation unit 421 receives profile information of the other device (the other communication device). As for the profile collected from the other device, the profile exchanger 221 supports a plurality of protocols, and converts the expression format of the profile in accordance with the profile information 222, as described with reference to FIG. 4.

Step S506 is also executed in the evaluation unit 421 of the profile determinator 225. In step S506, the evaluation unit 421 determines whether or not the acquisition request processing can be performed by using profile information of the other device (not shown). If it is impossible to respond to the acquisition request by using the profile information of the other device, error processing in step S511 is executed. That is, if it is difficult even for the other device 201 to implement a function described in the profile acquisition request, the error processing in step S511 is executed; otherwise, the process further advances to step S507. In other words, the evaluation unit 421 determines whether the combination of the profile information 222 of the device itself and the profile information of the other device collected in step S5055 contains the requested profile. If it does not contain the requested profile, the process advances to the error processing in step S511; otherwise, the process advances to step S507. In step S507, the profile information acquisition request is processed in accordance with the profile information 222 managed and the profile information of the other device (the other communication device).

Step S507 is also performed in the evaluation unit 421 of the profile determinator 225. In step S507, the evaluation unit 421 determines whether or not it is necessary to execute combining and edit processing on the profiles of the device itself 203 and other device 201 in order to respond to the profile acquisition request. If there exists other device 201 which can solely process the profile acquisition request completely, only profile exchange processing needs to be transferred to the other device 201. Hence, the process advances to step S509 in which the transfer processing is performed. If such other device 201 does not exist, the process advances to step S510 to obtain the same effect by combining functions of a plurality of the other devices 201. In other words, the evaluation unit 421 determines based on the profile information of the other devices collected in step S5055 whether there exists an other device which solely has the requested profile. If such other device exists, the process advances to the transfer processing in step S509; otherwise, the process advances to the edit processing in step S510.

In Step S508, a response is created based on the profile information 222 of the device itself 203. This processing is performed in the profile manager 223.

In step S509, the transfer processing is performed, in which a profile acquisition request to be transferred to another device (not shown) is created. That is, the processing is executed so that profile information of the other device (the other communication device) is transmitted to the transmission source of the acquisition request. The profile acquisition request to be transferred is created so that a destination to which the response to the acquisition request is to be returned is not the device itself 203 but the other device 201 as the transmission source of the profile acquisition request received in step S501. This processing is performed in the transfer processing unit 423 of the profile determinator 225. When, for example, the other device 201 is the digital camera 100 and the device itself 203 is the digital video camera 101, the processing is as follows.

If it is determined that the printer 102 has a profile requested by the digital camera 100, the digital video camera 101 creates a profile acquisition request for transfer of a profile acquisition request from the digital camera 100 to the printer 102. The profile acquisition request is a message which is configured so that the printer 102 returns the result of the profile acquisition request to the digital camera 100. Alternatively, the profile of the printer 102 collected in step S5055 may be sent back to the digital camera 100 as a profile returned from the printer 102.

Step S510 responds to the profile acquisition request by combining or editing the profile information 222 held by the plurality of the other devices 201. This processing is executed so that profile information containing the profile information 222 managed and the profile information of the other device (other communication device) is transmitted to the transmission source of the acquisition request. This processing is performed in the edit processing unit 422 of the profile determinator 225. Details will be described below.

Step S511 is error processing. The error processing is executed to return an error in place of a response to the other device 201 which has issued the profile acquisition request. This processing is performed in the profile manager 223.

In step S512, processing is executed for transferring the response created as explained above to the other device 201 as the actual requesting source. The device communicator 210 transmits, to the other device 201, the response from the profile manager 223 through the profile exchanger 221. Note that as described above or as will be described later, the request created in step S509 is transmitted to the other device other than the requesting source. As explained with reference to FIG. 4, the profile exchanger 221 converts a profile contained in the response into the expression format of the requested profile.

Figure 7:
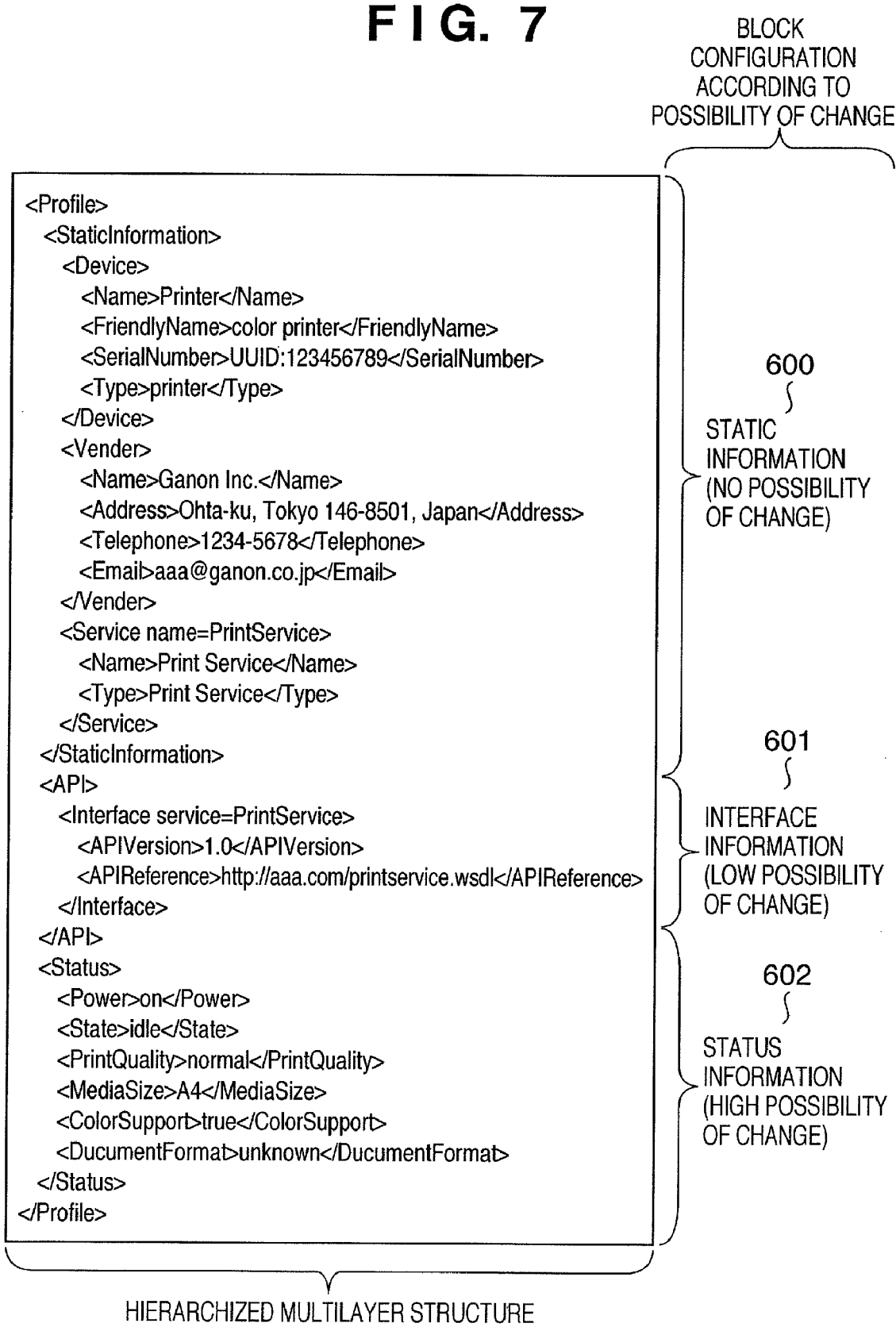
FIG. 7 is a view showing the structure of profile information used in a profile management system according to an embodiment of the present invention.

FIG. 7 shows an example of the profile information 222 held in the profile manager 223 in FIG. 3 according to an embodiment of the present invention. As shown in FIG. 7, individual elements constituting the profile information 222 have a hierarchized multilayer structure from which only necessary information can be obtained by tracing the hierarchy. In addition, this structure has three blocks different in possibility of change to each item of information, that is, static information 600 having no possibility of change, interface information 601 having low possibility of change, and status information having high possibility of change. A processing method can be changed from one block to another.

Note that the profile information includes the three blocks in accordance with the possibility of change in FIG. 7, but the number of blocks is not limited to 3. Note also that the block dividing method is not limited to the method corresponding to the possibility of change.

The structure of the profile information 222 is as described above. Therefore, the edit processing unit 422 in FIG. 5 can execute edit processing such as comparison and combining of the profile information 222 in part or in sequence in the edit processing of step S510 shown in FIG. 6.

FIGS. 8 to 11 are views showing practical examples of processing procedures according to an embodiment of the present invention.

FIG. 8 shows that devices such as a digital camera 701, printer 702, and display 703 are connected across a network 710. Each device has the device communicator 210, profile exchanger 221, profile information 222, profile manager 223, profile converter 224, profile determinator 225, device communicator 210, and device controller 211, which are shown in FIG. 3. Each device can open the profile information 222 of its own through the network 710, or obtain profile information of other devices. In addition, each device can request processing across a network through the device controller 211 of its own.

Referring to FIG. 8, the digital camera 701 is an image sensing device having a capability of recording still and moving images. An example of the profile information 222 held by the digital camera 701 is shown below the digital camera 701. Static information and interface information in the profile information 222 essentially do not change. Status information such as a remaining battery level and the number of recordable images is handled as information which may change. The structure of the profile information 222 complies with the structure of the information shown in FIG. 7.

The printer 702 is a printing device having two capabilities, that is, a capability of printing at high resolution and that of printing at low resolution. An example of the profile information 222 held by the printer 702 is shown below the printer 702. As in the digital camera 701, static information and interface information essentially do not change, but status information such as a remaining ink amount and a remaining sheet count is handled as information which may change. The structure of the profile information 222 complies with the structure of the information shown in FIG. 7.

The display 703 is a display device capable of displaying still and moving images. An example of the profile information 222 held by the display 703 is shown below the display 703. Although static information and interface information in the profile information 222 essentially do not change, status information such as a color temperature is handled as information which may change. The structure of the profile information 222 complies with the structure of the information shown in FIG. 7.

FIG. 9 shows a state in which the digital camera 701 issues an acquisition request 801 as a profile information acquisition request to the printer 702, and the printer 702 returns a processing result as a result response 803 to the digital camera 701, from a state in FIG. 8. The acquisition request 801 is issued across the network 710.

The acquisition request 801 is expressed by the information format shown in FIG. 7, similarly to the profile information 222. Since the acquisition request 801 designates only "service 1: output (still image)" as interface information, each device which has received the request recognizes the request as a response request to a device having the function. The information expression format used for the result response 803 is the same as the information format shown in FIG. 7, similarly to the profile information 222. The printer 702 determines that it can process the request with "service 1: printing (high resolution)" and "service 2: printing (low resolution)", which are contained in the profile information 222 held by the printer 702. The printer 702 returns, as a result, the profile information 222 of its own in the result response 803 to the acquisition request 801 without any change. This processing is performed in the printer 702 as a result of sequentially executing steps S501, S502, S504, and S505, the normal processing in step S508, and step S512 of the flowchart in FIG. 6.

FIG. 10 shows a state in which the digital camera 701 issues an acquisition request 901 as a profile information acquisition request to the printer 702 across the network 710, from a state in FIG. 8, similarly to FIG. 9. FIG. 10 shows a state in which the display 703 in place of the printer 702 returns a processing result as a result response 903. Unlike the acquisition request 801, the acquisition request 901 requires "service 1: output (moving image)" which cannot be implemented by the functions of the printer 702 as an initial request receiver. Hence, the printer 702 transfers the acquisition request as an acquisition request 902 to the display 703. Consequently, the display 703 returns a result to the digital camera 701. Profile information of the display 703 is transmitted in the result response 903 because the display 703 returns the result. This processing is performed in the printer 702 as a result of sequentially executing steps S501, S502, S504, S505, S5055, S506, and S507, and the transfer processing in step S509 of the flowchart in FIG. 6.

Note that the acquisition request 902 is a message which is created in the transfer processing of step S509 and transmitted in step S512. The printer 702 creates the acquisition request 902 to the display 703 in the transfer processing of step S509 so that the display 703 transmits its profile information to the digital camera 701 as the transmission source of the acquisition request 901.

In step S5055, the printer 702 may transmit the acquisition request 902 to the display 703, and receive the result response 903 from the display 703. In step S509, the printer 702 may create a result containing a profile of the display 703. In this case, the printer 702 transmits the result to the digital camera 701 as a response from the display 703 in step S512. That is, the printer 702 may return the profile information of the display 703 obtained in step S5055 to the digital camera 701 which has issued the acquisition request 901.

FIG. 11 shows a state in which the digital camera 701 issues an acquisition request 1001 as a profile information acquisition request to the printer 702, and the printer 702 returns a processing result as a result response 1004, from the state in FIG. 8, similarly to FIG. 9.

Note that the acquisition request 1001 is issued across the network 710. Unlike the processing in FIGS. 9 and 10, the acquisition request 1001 requires "service 1: output (moving image)" and "service 2: output (still image)", which can be implemented by neither of the individual functions of the printer 702 as an initial request receiver and the display 703.

The processing in FIG. 11 is the same as in FIG. 10 up to the point where the printer 702 transfers the acquisition request to the display 703 as an acquisition request 1002. A difference from FIG. 10 is that the printer 702 receives a result response 1003 from the display 703. Another difference is that the printer 702 returns, to the digital camera 701, information obtained by combining the profile information 222 of the printer 702 and that of the display 703 as the contents of the result response 1004 to be sent back to the digital camera 701. When receiving a request which neither the printer 702 nor another device can solely process, the printer 702 determines (based on the combined profile information) in the processing within itself whether it is possible to meet the requirement by combining the functions of the printer 702 and the other device. If the printer 702 determines that it is possible to do so, the printer 702 executes processing for creating and returning the profile information 222 as if a device having the combined function existed. This processing is performed in the printer 702 as a result of sequentially executing steps S501, S502, S504, S505, S5055, S506, and S507, the edit processing in step S510, and step S512 of the flowchart in FIG. 6.

Note that the acquisition request 1002 and the result response 1003 in FIG. 11 are transmitted/received in step S5055 of FIG. 6. The result response 1004 is a message which is edited in step S519 and transmitted in step S512.

Although a profile obtained by combining the profiles of the printer 702 and display 703 is returned in FIG. 11, a profile obtained by combining profiles of three or more devices may be returned. Also, a profile obtained by combining profiles of a plurality of devices other than the printer 702 (e.g., a profile obtained by combining the profile of the display 703 and a profile of a printer (not shown)) may be returned.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2004-366007, filed Dec. 17, 2004 which is hereby incorporated by reference herein in its entirety.

The invention claimed is:

1. A communication device communicating with another communication device via a network, comprising:
    a processor;
    a memory;
    a management unit adapted to manage profile information of the communication device itself communicating with said another communication device via the network;
    a reception unit adapted to receive a search request for a communication device having specific profile information and to receive profile information of said another communication device;
    a determination unit adapted to determine whether or not the specific profile information is contained within the managed profile information, to determine whether or not the specific profile information is contained within a combination of the profile information managed by said management unit and the profile information of said another communication device received by said reception unit, and to determine whether or not there is a communication device which by itself has the specific profile information; and
    a transmission unit adapted to, in a case where the specific profile information is not contained within the profile information managed by said management unit and where there is a communication device which by itself has the specific profile information, transmit to the communication device which by itself has the specific profile information, an acquisition request for profile information, which is generated such that the profile information of the communication device which by itself has the specific profile information is transmitted from the communication device which by itself has the specific profile information to a transmission source of the search request received by said reception unit,
    and to, in a case where the specific profile information is not contained within the profile information managed by said management unit, where the specific profile information is contained within the combination of the profile information managed by said management unit and the profile information of said another communication device received by said reception unit, and where there is not a communication device which by itself has the specific profile information, transmit to the transmission source of the search request received by said reception unit, profile information containing the profile information managed by said management unit and the profile information of said another communication device received by said reception unit.

2. The communication device according to claim 1, further comprising a conversion unit adapted to convert profile information which corresponds to the profile information managed by said management unit and the profile information of said another communication device received by said reception unit, in accordance with an expression format of the acquisition request.

3. The communication device according to claim 1, wherein said transmission unit collects a profile of said another communication device in response to the search request for the communication device having the specific profile.

4. A profile information acquisition request processing method for a communication device which manages profile information and communicates with another communication device via a network, comprising:
   receiving a search request for a communication device having specific profile information;
   receiving profile information of said another communication device;
   determining whether or not the specific profile information is contained within the managed profile information;
   determining whether or not the specific profile information is contained within a combination of managed profile information and the received profile information of said another communication device;
   determining whether or not there is a communication device which by itself has the specific profile information;
   in a case where the specific profile information is not contained within the managed profile information and where there is a communication device which by itself has the specific profile information, transmitting to the communication device which by itself has the specific profile information, an acquisition request for profile information, which is generated such that the profile information of the communication device which by itself has the specific profile information is transmitted from the communication device which by itself has the specific profile information to a transmission source of the received search request; and
   in a case where the specific profile information is not contained within the managed profile information, where the specific profile information is contained within the combination of the managed profile information and the received profile information of said another communication device, and where there is not a communication device which by itself has the specific profile information, transmitting, to the transmission source of the received search request, profile information containing the managed profile information and the received profile information of said another communication device.

5. The profile information acquisition request processing method according to claim 4, further comprising collecting a profile of said another communication device in response to the search request for the communication device having the specific profile.

6. A non-transitory computer-readable storage medium which records a program for causing a computer to execute a profile information acquisition request processing method for a communication device which manages profile information and communicates with another communication device via a network, the method comprising:
   receiving a search request for a communication device having specific profile information;
   receiving profile information of said another communication device;
   determining whether or not the specific profile information is contained within the managed profile information;
   determining whether or not the specific profile information is contained within a combination of the managed profile information and the received profile information of said another communication device;
   determining whether or not there is a communication device which by itself has the specific profile information;
   in a case where the specific profile information is not contained within the managed profile information and where there is a communication device which by itself has the specific profile information, transmitting to the communication device which by itself has the specific profile information, an acquisition request for profile information, which is generated such that the profile information of the communication device which by itself has the specific profile information is transmitted from the communication device which by itself has the specific profile information to a transmission source of the received search request; and
   in a case where the specific profile information is not contained within the managed profile information, where the specific profile information is contained within the combination of the managed profile information and the received profile information of said another communication device, and where there is not a communication device which by itself has the specific profile information, transmitting, to the transmission source of the received search request, profile information containing the managed profile information and the received profile information of said another communication device.

* * * * *